United States Patent
Charier et al.

(10) Patent No.: US 11,052,994 B2
(45) Date of Patent: Jul. 6, 2021

(54) SYSTEM FOR CHANGING THE PITCH OF A TURBOPROP ENGINE COMPRISING AN UPSTREAM PAIR OF CONTRAROTATING PROPELLERS

(71) Applicant: SAFRAN AIRCRAFT ENGINES, Paris (FR)

(72) Inventors: Gilles Alain Charier, La Grande Paroisse (FR); Thomas Julien Nguyen Van, Alfortville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 341 days.

(21) Appl. No.: 16/067,523

(22) PCT Filed: Dec. 22, 2016

(86) PCT No.: PCT/FR2016/053644
§ 371 (c)(1),
(2) Date: Jun. 29, 2018

(87) PCT Pub. No.: WO2017/118791
PCT Pub. Date: Jul. 13, 2017

(65) Prior Publication Data
US 2020/0247528 A1 Aug. 6, 2020

(30) Foreign Application Priority Data

Jan. 5, 2016 (FR) ...................................... 1650020

(51) Int. Cl.
*B64C 11/30* (2006.01)
*F01D 7/00* (2006.01)
(Continued)

(52) U.S. Cl.
CPC .............. *B64C 11/306* (2013.01); *F01D 7/00* (2013.01); *F02C 3/067* (2013.01); *F02C 7/36* (2013.01);
(Continued)

(58) Field of Classification Search
CPC ...................................................... B64C 11/036
See application file for complete search history.

(56) References Cited

U.S. PATENT DOCUMENTS

| 2,455,239 A | 11/1948 | Doussain |
| 2,760,738 A | 8/1956 | Robertson |

(Continued)

FOREIGN PATENT DOCUMENTS

| EP | 2907747 A1 | 8/2015 | |
| FR | 877773 A * | 12/1942 | ........... B64C 11/306 |

(Continued)

OTHER PUBLICATIONS

International Search Report and Written Opinion received for PCT Patent Application No. PCT/FR2016/053644, dated Apr. 24, 2017, 19 pages (10 pages of English Translation and 9 pages of Original Document).

*Primary Examiner* — Juan G Flores
(74) *Attorney, Agent, or Firm* — Womble Bond Dickinson (US) LLP

(57) ABSTRACT

A turbine engine module including an upstream propulsive unit including a propellers doublet that are upstream and downstream, respectively mounted around an axis, a power turbine shaft with axis of rotation intended for rotating the propellers doublet, a speed reducer connected to the propellers doublet and driven by the shaft, and, a pitch-changing system including a cylinder that controls the pitch of the blades of the upstream propeller the rotational axis of the propellers doublet is shifted in relation to that of the shaft.

(Continued)

The cylinder is placed downstream of the reducer, and the pitch-changing system includes a shaft for controlling the pitch of the blades that connect the cylinder to the blades of the upstream propeller.

12 Claims, 6 Drawing Sheets

(51) Int. Cl.
     *F02C 3/067*     (2006.01)
     *F02C 7/36*      (2006.01)

(52) U.S. Cl.
     CPC .................. *F05D 2250/44* (2013.01); *F05D 2260/40311* (2013.01)

(56) References Cited

U.S. PATENT DOCUMENTS

| | | | | |
|---|---|---|---|---|
| 5,090,869 A | * | 2/1992 | Wright | .................. B64C 11/306 416/127 |
| 2005/0229605 A1 | | 10/2005 | Bouchard et al. | |

FOREIGN PATENT DOCUMENTS

| | | | |
|---|---|---|---|
| FR | 0877773 | A | 12/1942 |
| FR | 0993914 | A | 11/1951 |

* cited by examiner

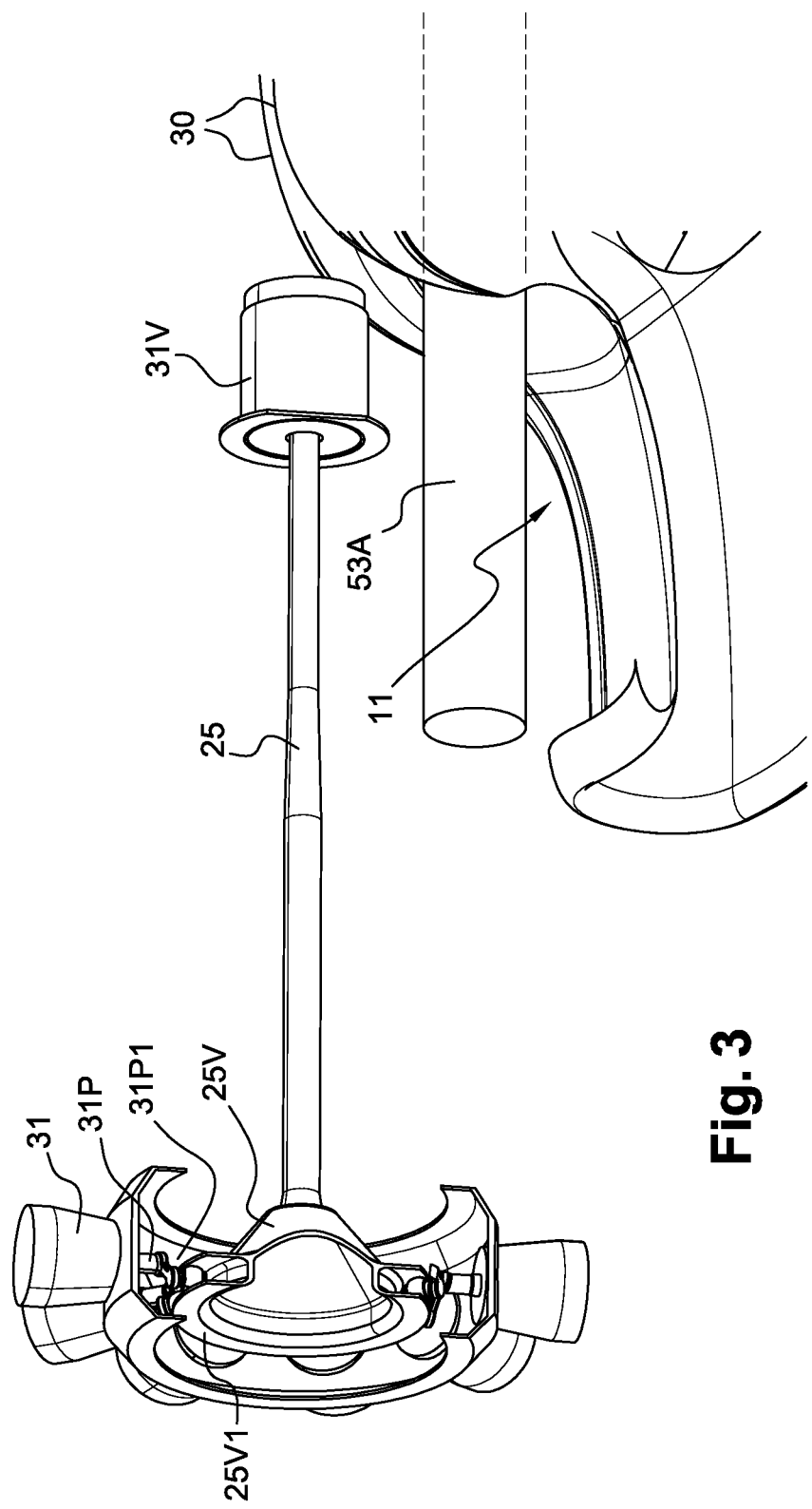

SYSTEM FOR CHANGING THE PITCH OF A TURBOPROP ENGINE COMPRISING AN UPSTREAM PAIR OF CONTRAROTATING PROPELLERS

FIELD OF THE INVENTION

This invention relates to the field of aeronautical propulsion. It relates to a module with a propellers doublet driven by a turbine engine, in particular gas turbine and mounted upstream of the latter. It relates more particularly to a system for changing the pitch of the blades of the upstream propeller of the pair.

PRIOR ART

Documents U.S. Pat. No. 2,455,239, US-A1-2005/229605, FR-A-993 914, EP-A1-2 907 747 and U.S. Pat. No. 2,760,738 represent the prior art of this application.

Engines with propellers doublet are designated in the field by the expressions "open rotor" or unducted fan engine. They are in fact distinguished from multiflow turbojets by the use of a propeller instead of a fan. It is moreover formed from two contrarotating coaxial propellers. The development of these engines relates to an architecture wherein the propellers are either at the rear of the gas generator and designated as "pusher", or at the front, in other words upstream thereof and designated as "puller". The invention relates to an engine of this latter type.

The prior art shows for this case that the propellers forming the propulsive unit and the gas generator are coaxial, in line with one another. The engine is said to be in-line.

The driving of the propellers by the power turbine coupled to the gas generator, rotating at a higher speed than the propellers, is carried out through a differential reducer.

The air intake can be arranged in different ways, upstream of the propellers with a central opening and an annular channel between the hub and a ring gear supporting the blades of the propellers. The air intake can also be arranged between the propellers doublet in the form of an annular channel. The air intake can finally be arranged behind the propellers and have, for example, a single-lobe shape.

In an architecture with a propulsive unit with two upstream propellers, it is also important to give attention to the arrangement of the service equipment. Each propeller, with variable adjustment, comprises a pitch-changing mechanism for varying the pitch of the blades with a cylinder for driving pivots in rotation. The various cylinders must be able to be supplied with fluidic and electrical service equipment. When said cylinders are arranged upstream, this service equipment has to be passed from a fixed reference, linked to the structural casing, to a rotating reference on the propellers. In particular, the cylinder being rotating, the oil must pass through an oil transfer system that generates many leaks. Furthermore, passing the electrical service equipment from a fixed reference to a rotating reference requires installing a rotating transformer. Finally, it is also desirable to not have to pass through the air duct supplying the gas generator due to the induced pressure drop.

This applicant has set as a first objective the implementation of a pitch-changing system of the propellers that is more compact and lighter in comparison with known solutions. The invention in particular relates to the system for changing the pitch of the blades of the upstream propeller, with the purpose of improving the performance and the integration thereof.

The applicant has also set as an objective the production of an engine with an upstream propellers doublet, wherein the transmission of power between the power turbine and the propellers doublet allows for an easy installation between a speed reducer and the turbine that drives it.

The applicant has also set as an objective the production an engine the air intake of which is both not very sensitive to the variations in incidence of the aircraft and induces a load loss that is as low as possible for an engine length that is as low as possible.

The applicant has also set as an objective the production of an engine the arrangement of which allows for a low hub ratio.

DESCRIPTION OF THE INVENTION

These objectives are achieved, in accordance with the invention, with a turbine engine module comprising an upstream propulsive unit comprising an upstream propeller with a propellers doublet respectively upstream and downstream, a power turbine shaft intended for rotating propellers doublet, a speed reducer connected to both propellers and driven by the turbine shaft, a pitch-changing system including a cylinder that controls the pitch of the blades of the upstream propeller, the rotational axis of the propellers doublet being shifted in relation to that of the turbine shaft, the cylinder being arranged downstream of the speed reducer, and the pitch-changing system comprising a shaft for controlling the pitch of the blades connecting the cylinder to the blades of the upstream propeller, the cylinder being arranged in such a way as to move the control shaft axially.

An advantage of this solution is the possibility of fitting the front cone of the propulsive unit with a lightened system for controlling the pitch of the blades, allowing for a positioning of the centre of gravity downstream with respect to the propulsive unit, favourable to the suspension of the engine. This solution is also more compact with respect to the solutions of the prior art which use in particular an annular cylinder.

In particular, the cylinder is configured in such a way as to drive a movement in translation of the control shaft along the rotational axis of the doublet propellers in such a way as to drive the change in pitch of the blades of the upstream propeller.

In accordance with an advantageous embodiment, the speed reducer comprises a differential gear train with a sun gear, a planetary carrier and a ring gear. More precisely, the control shaft passes through the sun gear.

In accordance with another feature, the control shaft is movable in translation along the rotational axis of the propellers doublet.

In accordance with another feature, the pitch-changing system comprises a pitch-changing mechanism which comprises blade pivots, the control shaft being connected to the levers adjusting the blade pivots in such a way that the axial movement of the shaft causes the change in the pitch of the blades.

Preferably, the kinematics between the pitch-changing mechanism, the control shaft and the cylinder is arranged in such a way that the control shaft works at least in traction.

This results in the advantage of allowing for the use of a control shaft with a relatively small diameter. It is certain that the diameter of the control shaft is an important parameter in the design of the propulsive unit: it influences the size of the sun gear in the speed reducer and therefore the diameter of the latter. Note that the reduction in the diameter of the control shaft is also due to the absence of ducts of service equipment such as are found in the embodiments of prior art, i.e. the high-pressure oil ducts for supplying the cylinder.

The invention allows for the routing of the few remaining items of service equipment in the static reference. Such an arrangement is not possible in the case of an in-line architecture. Furthermore, incorporating a sheath into the propulsive unit offset with respect to the gas generator allows for easier access.

In accordance with another feature, the control shaft is integral in rotation with the upstream propeller. It is movable in translation with respect to the latter and for this purpose it is guided by guideways, in particular with balls, inside the rotor of the upstream propeller.

Since the cylinder is fixed, integral with the structural members of the engine, the control shaft is rotatably mounted with respect to the movable member of the cylinder by means of a load transfer bearing. This bearing provides both the rotating nature of the control shaft and the transmission of the axial forces exerted by the movable member of the cylinder.

In accordance with other features, taken individually or in combination:

The air intake of the engine comprising an air intake sleeve, the air intake sleeve is in the form of a lobe adjacent to the speed reducer.

The speed reducer comprises a first stage in the form of a simple gear train between the power shaft and the differential reducer, in particular the simple gear train of the first stage comprises a wheel connected to the sun gear of the speed reducer.

The planetary carrier of the speed reducer connected to the upstream propeller and the ring gear to the downstream propeller of the doublet propellers.

The differential reducer comprises sun gear, a planetary carrier and a ring gear, the planetary carrier being connected to the upstream propeller and the ring gear to the downstream propeller.

The turbine engine module comprises a fixed structure with a sleeve, a first shaft element supported by means of bearings inside the sleeve, said first shaft element connecting the ring gear to the upstream propeller of the doublet; the turbine engine module also comprises a second shaft element supported by bearings inside the first shaft element, with the second shaft element connecting the planetary carrier to the downstream propeller of the propellers doublet.

The invention also relates to a turbine engine comprising a module that has any of the features mentioned hereinabove.

According to a feature of the invention, the turbine engine comprises a gas generator that has a main axis and driving the power turbine about this axis.

Thus, through the combination of an offset of the turbine shafts and propellers and an air intake sleeve adjacent to the speed reducer, the length of the engine is reduced in relation to in-line engines (in that at least 80% of the axial size of the transmission is taken up by the size of the air intake sleeve) while still complying with the constraint of maintaining a small diversion of the air between the intake sleeve and the intake of the compressor. This results in a savings in mass, the conditions of access are improved for maintenance of the main modules, which are the gas generator and the propulsive unit, the air intake when it is single-lobed and offset makes it possible to improve the aerodynamic performance of the channel guiding the air to the intake of the compressor and to easily integrate a particle trap, the integration of the external configuration is easier; the engine has more space to house the equipment (AGB, pump, etc.) which moreover is located in a cold portion of the engine, the installation of the engine such as that for a turboprop is possible, with the advantage, with respect to an in-line engine, of having increased ground clearance, for the same propeller diameter, rotating casings with a large diameter present on the other engine architectures can be avoided because there is no air duct passing through the hub. This results in a substantial reduction in mass.

In particular, the stage of gears between the power shaft and the speed reducer:

makes it possible to have an additional degree of freedom in determining the speeds and torques of the propellers with respect to the power turbine. This is because, in a differential transmission, the ratio of the torques between the two outputs is linked to the input/output reduction ratio. With this additional stage, it is possible to optimise the characteristics of the power turbine—A fast power turbine has a lesser mass because it is possible to reduce its average radius and the integration thereof is also facilitated. This additional stage also makes it possible to have more freedom to reduce the mass of the differential. Several solutions can be explored and combined: increasing the reduction ratio in order to reduce the diameter of the central sun gear, reducing the diameter of the planetary gears, or optimising the overall reduction ratio in order to reduce the total mass of the wheels.

The ratio between the torques of the downstream propeller and of the upstream propeller is fixed by aerodynamic and acoustic parameters in such a way as to have an optimum propulsive output of the doublet propellers. The overall reduction ratio is different from the reduction ratio of the differential transmission. It is sought to have an overall reduction ratio between 8 and 15 and a reduction ratio on the differential portion between 6 and 11. The overall transmission ratio is between 0.5 and 2 of the reduction ratio of the differential transmission. A multiplier ratio for the simple gear train is preferably chosen in such a way as to have speed ratios correlated with the aforementioned torque ratio. In particular it is sought to have a differential with a higher reduction ratio in order to limit its weight.

In parallel, the simple gear train produces an offset between the axes of the propulsive unit and of the generator. This offset makes it possible to provide an optimisation of the modularity between the propulsive unit and the gas generator as well as a low hub ratio at the propellers, made possible by the absence of an inner stream in the propulsive unit. It also makes it possible to directly drive equipment via the speed reducer, for example a load compressor.

The diversion of the flow of the air intake due to the by-passing of the ring gear is reduced by the offset between the axes. As close as possible to the air intake sleeve, the distance to be by-passed is now only the radius of the input gear of the simple gear train. In a preferred embodiment of the invention, the input gear has a radius at least two times smaller than that of the ring gear.

Alternatively, this offset can be carried out by drive shafts, constant velocity seals, or a system that combines a hydraulic pump and motor.

BRIEF DESCRIPTION OF THE FIGURES

The invention will be better understood, and other purposes, details, features and advantages thereof will appear more clearly when reading the following detailed explanatory description of embodiments of the invention given by way of example solely for the purposes of illustration and in no way limiting, in reference to the accompany diagrammatical drawings.

In these drawings:

FIG. 3 shows the detail relating to the control shaft of the pitch adjustment for the upstream propeller;

DESCRIPTION OF EMBODIMENTS OF THE INVENTION

Figure 1:
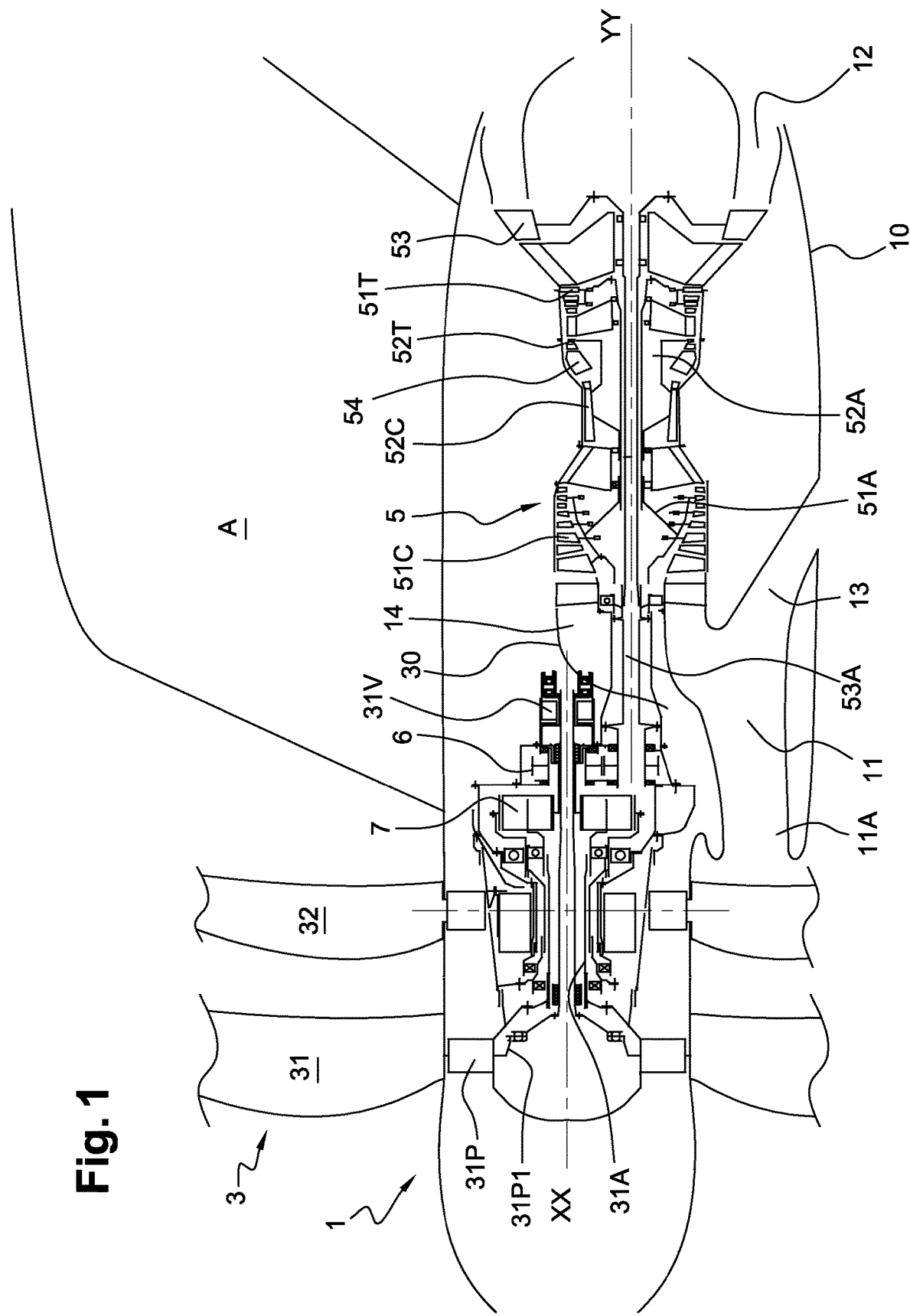
FIG. 1 diagrammatically shows as an axial cross-section an example of an engine in accordance with the invention.

In reference to FIG. 1, the turbine engine 1 is shown in the position to be mounted on an aircraft A for example in the rear portion of the fuselage. It can be attached to the latter in two suspension planes, an upstream plane and a downstream plane. The turbine engine comprises a module comprising, in the downstream direction, a propulsive unit 3 formed of two contrarotating propellers, 31 and 32, that are upstream and downstream respectively, rotating around an axis XX, referred to as the axis of the propulsive unit. In the downstream direction, the turbine engine comprises a gas generator 5 which is formed from a gas turbine engine with a compression unit, a combustion chamber 54 and a set of turbines. The gases of the gas generator 5 are ejected into the atmosphere by an ejection nozzle 12 at the rear of the engine. The shafts of the gas generator 5 are coaxial and mounted so as to rotate about an axis YY, referred to as the axis of the gas generator. The axes XX and YY are offset with respect to one another. In FIG. 1, the axes XX and YY are radially offset. In relation to the position on the aircraft, in FIG. 1, the axis XX is positioned above the axis YY; it makes it possible to increase the distance from the ground to the propulsive unit and to have an engine that is positioned lower on the aircraft or positioned on an aircraft that requires substantial ground clearance.

The offset also makes it possible, where applicable, to bring the gas generator closer to the fuselage in order to limit the overhang of the engine while still moving away from the propellers. In this case the axes will rather be at the same height but offset horizontally or offset in height and horizontally.

A portion of the power supplied by the gas generator 5 is transmitted by a shaft 53A to the propulsive unit. The shaft 53A is extended in the upstream direction and drives the rotors 31 and 32 of the propulsive unit through a speed reducer of the turbine engine module. The speed reducer comprises a differential reducer 7 and a first stage 6 with a simple gear train. The gear train is said to be simple because the axes of the gear wheels are fixed.

Figure 2:
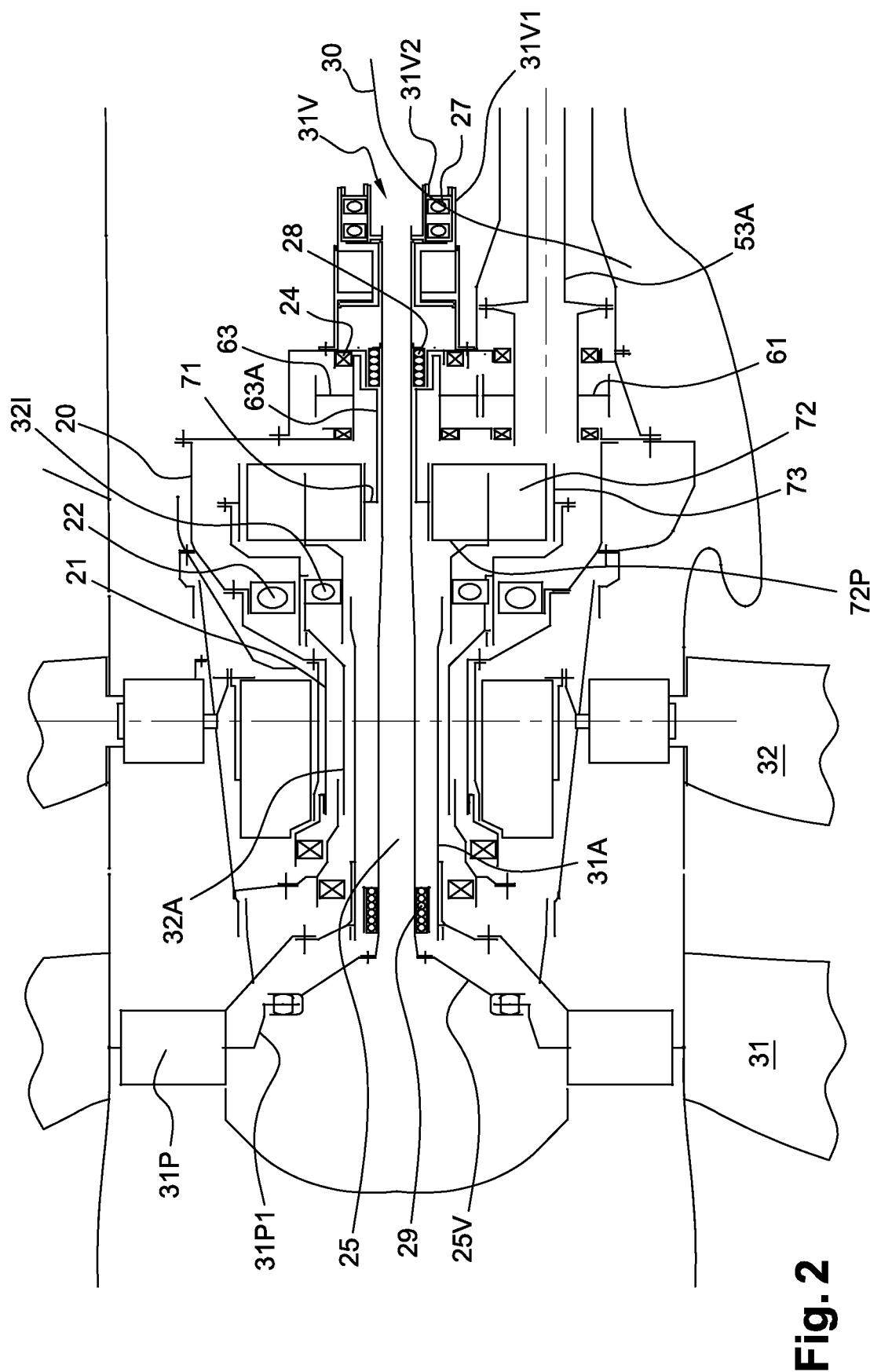
FIG. 2 shows in more detail the structural elements of an embodiment of an engine according to the invention.

The gas generator 5 is housed in a nacelle 10 that comprises an air intake sleeve 11 in order to supply the gas generator with air. This air intake sleeve is adjacent to the unit formed by the simple gear train 6 and the differential gear train 7. The entry plane 11a of the sleeve 11 is perpendicular to the axis XX. As can be seen in FIGS. 1 and 2, the entry plane 11a of the sleeve 11 is substantially located radially below the speed reducer. This entry plane 11a is substantially upstream of the differential speed reducer 7. The sleeve 11 is arranged in such a way as to direct the incoming air in a direction parallel to XX along the speed reducer and then, downstream of the latter with the channel forming an internal elbow, to divert it to a channel 14 at the entry of the compressor of the gas generator 5. The curvature of the air intake duct allows for the incorporation of a trap 13 for particles and foreign objects that can damage the engine.

Note that the offset between the axes makes it possible to integrate the air sleeve 11 with an opening height that is more favourable in terms of pressure drop compared with annual openings. This results from the limit layer which in this air intake channel occupies a relatively small portion thereof compared with undisturbed air outside this limit layer. The width of the sleeve 11 extends over a portion of a circle, for example 90°.

Moreover, advantageously, the upstream lip of the air intake sleeve, on the nacelle side, is detached from the latter in such a way as to prevent or at least reduce the ingestion of the air of the boundary layer formed by the flow along the rotating nacelles of the propellers.

The gas generator 5 is formed from a gas turbine engine with a compression unit, a combustion chamber 54 and a set of turbines. The generator is formed here of three rotors 51, 52, 53. The two rotors 51 and 52 respectively comprise a compressor 51C, 52C and a turbine 51T, 52T, connected by a shaft, 51A and 52A. The shafts of the generator 5 are coaxial and are mounted so as to rotate about the axis YY. The combustion chamber 54 is arranged between the compressor 52C, a high-pressure compressor, and the turbine 52T, a high-pressure turbine. Downstream of the turbine 51T, a low-pressure turbine, a power turbine 53 is mounted on the shaft 53A coaxial with the shafts 51A and 52A.

In reference to FIG. 2, the first stage 6 with a simple gear train comprises according to this embodiment a gear wheel 61, integral with the shaft 53A, meshing with a gear wheel 63, mounted so as to rotate about the axis XX of the propulsive unit. The offset between the axes XX and YY corresponds to the difference between the axes of the two wheels 61 and 63. According to the respective radii of the two wheels this first stage 6 drives a reduction or an increase in the speed of rotation between the input and output gears. The gear train is said to be simple because the axes are fixed, unlike the differential.

The wheel 63 drives the wheels of the differential reducer 7. This differential comprises a central sun gear 71, a ring gear 73 and, between the two, the planet gears 72 mounted on the planetary carrier 72P. The three elements 71, 73 and 72P of the differential and the axis XX are coaxial.

The shafts 31A and 32A of the rotors of the propulsive unit are coaxial with the axis XX and are respectively integral with the planetary carrier 72P and the ring gear 73 of the differential reducer.

The output wheel 63 of the first reduction stage drives via its shaft the shaft of the sun gear 71.

The propulsive unit of the turbine engine comprises a pitch-changing system for changing the pitch of the propellers. In particular, the pitch-changing system comprises at least one cylinder shown diagrammatically here as 31V controlling the pitch of the blades of each upstream propeller. For example, the modification of the pitch is provided by the driving of the blades by a crank about their axis.

The fixed structure 20 comprises a set of casing elements forming bearing supports. Thus the casing comprises a sleeve 21 extending in the upstream direction. This sleeve 21 and the shafts 32A and 31A of the two propellers are coaxial. The sleeve supports, by means of bearings 22, the shaft 32A of the downstream propeller connected to the ring gear 73 of the differential reducer. This shaft 32A is integral at its other end with the hub of the downstream propeller 32.

The shaft 31A, connected to the upstream propeller 31, is supported by the shaft 32A by means of inter-shaft bearings 321. Downstream, the shaft 31A is attached to the planetary carrier 72p and is integral with it.

The shaft 63A connecting the gear wheel of the first stage 6 to the sun gear 71 is supported by a fixed casing element by means of bearings 24.

The pitch-changing system comprises a control shaft intended to act on the blades of the propeller. In particular, the control shaft 25 which is housed inside the shafts 63A and 31A. The cylinder is configured in such a way as to drive a movement in translation of the control shaft along the rotational axis of the doublet propellers in such a way as to cause the change in pitch of the blades of the upstream propeller. For this, the control shaft 25 connects the cylinder 31V to the blades of the upstream propeller. The pitch-changing system comprises a pitch-changing mechanism and a ferrule 25V for actuating the pitch-changing mechanism. The control shaft 25 is connected to the ferrule 25V. The cylinder acts on the connection mechanism via the control shaft 25 in such a way as to cause the rotation of the blades of the propeller. The pitch-changing mechanism comprises levers 31P1 for adjusting the pivots 31P of the blades of the upstream propeller 31. This ferrule 25V comprises a rail 25V1 perpendicular to the direction XX and wherein are housed rollers of the cranks forming the adjustment levers 31P1. The levers are integral with the pivots 31P in such a way that the movement in translation of the ferrule 25V along the axis XX causes the movement of the rollers in the guide rail and the rotation of the pivots 31P about their axis. The rail 25V1 as such forms a ring for synchronising the adjustment of the pitches. The ferrule 25V here has a tapered shape and its apex is integral with the control shaft 25. This control shaft 25 is mounted inside the shaft 31A of the upstream propeller, in such a way as to be integral in rotation with the latter, by means of a guideway 29 that allows for the movement in translation of the control shaft 25 along the axis XX. The movement in translation of the control shaft 25 causes the movement in translation of the ferrule 25V. The control shaft 25 is also supported inside the shaft 63A in the downstream direction, connecting the wheel of the first speed reduction stage 6 to the sun gear 71 of the speed reducer 7, via a guideway 28 that allows both the axial movement of the shaft 25 and the rotation of the shaft 25A with respect to the shaft 63A. The guideways 28, 29 can be guideways with balls. Note that the two guideways 28, 29 allow for translations and rotations about the main axis XX. However, the upstream guideway 29 substantially sees movements in translation while the downstream guideway 28 sees movements in translation and is in constant rotation because the latter is placed between the casing and the control shaft 25. This control shaft 25 is linked in rotation to the propeller either by the system that transforms its back-and-forth movement into adjustment of the pitches of the propellers or via a specific stop in rotation. A specific stop can be carried out by splines between the control shaft 25 and the propeller shaft 31A.

The control shaft 25 is itself controlled by the cylinder 31V. The latter is mounted on the fixed structure of the casing. Here, the cylinder 31V comprises a stator structure 31V1 arranging a chamber supplied with oil through which a piston 31V2 can be put into translation movement along the axis XX. This piston here coaxial with respect to the axis XX is connected to the control shaft 25 through the bias of a load transfer bearing 27. This bearing 27 comprises an outer ring integral with the piston 31V2 and an inner ring integral with the control shaft 25; between the two are bearings that ensure the rotation with respect to one another. These bearings are arranged in such a way as to be able to transmit the axial forces of the piston to the control shaft 25. These bearings are for example two ball bearings of the angular contact type oriented in opposite directions in such a way as to optimise the transmission of the axial forces. The pitch-changing mechanism of the blades of the upstream propeller 31 is thus controlled by a cylinder the movable member of which is moved only in translation, without rotation. This cylinder 31V is furthermore placed downstream of the speed reducer 6-7 in a volume rendered available via the offset of the axes XX and YY. The space located in the cone of the upstream propeller 31 can thus be occupied only by the control levers and the synchronisation ferrule which limits the overhanging mass. The cylinder is here shown in line with the axis XX but it can be offset with respect to this axis. The bearing 27 is also mounted downstream of the speed reducer 6-7.

The load transfer bearing 27 and the cylinder 31V are arranged in such a way as to be housed in a space between the speed reducer and the air intake sleeve 11. In reference to FIG. 3, the air intake sleeve 11 has two arms 30 rising along the shaft 53A driving the speed reducer and which connect the solid-cross-section channel which here is oblong from the air intake to the annular channel 14 supplying the compressor. It can be seen in particular in FIGS. 1, 2 and 3 that the volume between the arms 30 is partially occupied by the shaft 53A on its lower portion, and the upper volume which is not very accessible can advantageously be occupied by the cylinder 31V and the load transfer bearing 27.

FIG. 3 shows the arrangement of the mechanism for changing the pitch of the blades of the upstream propeller. It can be seen that it is favourably integrated with respect to the air intake sleeve 11. The ferrule 25V for actuating and synchronisation is located inside the hub of the rotor of the propeller 31 with a rail at its periphery guiding the rollers of the adjustment levers. The unit is thus both compact and robust.

The operation of this engine is as follows. The air is guided by the sleeve 11 to the compressor of the gas generator 5 which supplies suitable energy for driving the engine shaft 53A. The gases coming from the engine are ejected through the nozzle 12.

The shaft 53A drives in rotation the gears of the first stage 6, the rotation speed of the gear at the output with respect to that of the shaft 53A is determined by the reduction/ or increase ratio defined with the characteristics of the engine.

The output gear of the first stage drives the sun gear of the differential 7 which sets into rotation the planetary carrier and the planet gears that the latter supports. These planet gears drive the ring gear in reverse rotation with respect to that of the sun gear. The propellers doublet are as such driven in opposite rotations by the shaft 53A.

The control of the adjustment of the pivots of the upstream propeller is provided by the cylinder 31V, the piston of which is moved solely in translation and causes the translation of the control shaft 25 which is integral in rotation with the upstream propeller.

Figure 4A:
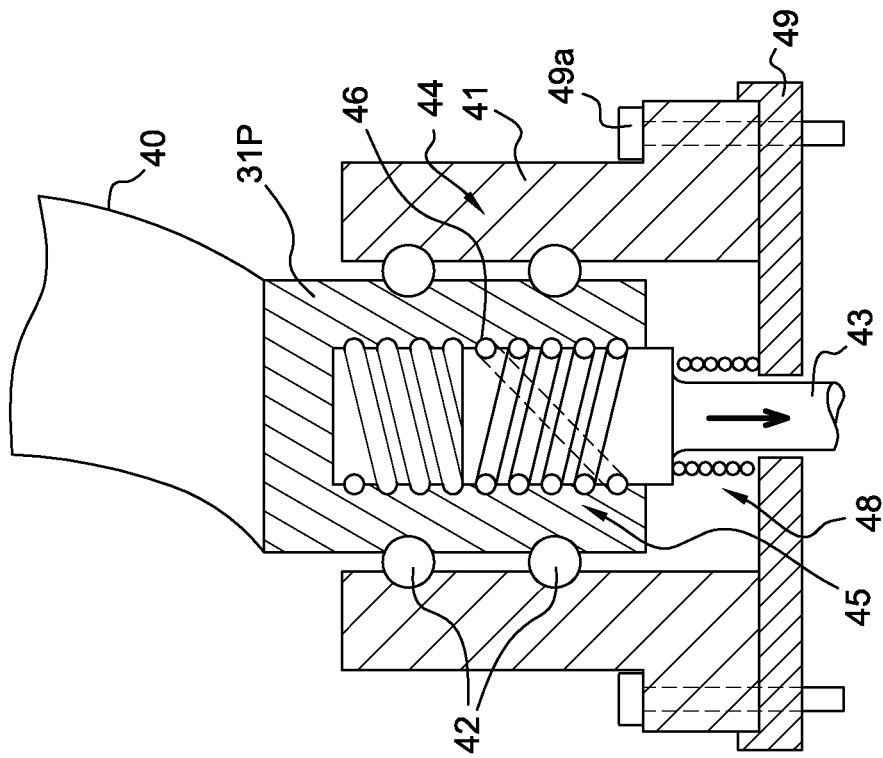
FIGS. 4A and 4B show an embodiment of a pitch-changing system according to the invention.
Figure 4B:
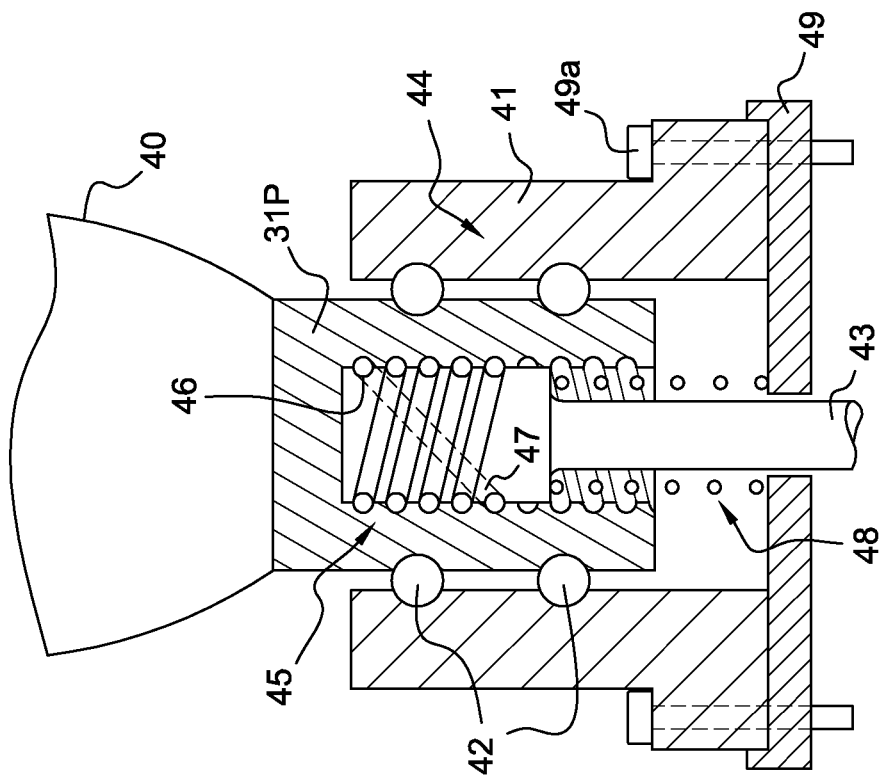

FIGS. 4A and 4B show another embodiment of the pitch-changing mechanism according to the invention. As shown, the pivot 31P of the upstream propeller is mounted on a ring 41 by means of ball bearings 42 that allow for a radial holding here of the blade 40 on the ring while still allowing the rotation thereof about a radial axis. In other words, the blade 40 cannot be moved radially. The ring 41 can be for example a polygonal ring. These ball bearings 42 advantageously make it possible to take up the centrifugal forces of the pivot 31P of the blade. The latter also make it possible for the pitch-changing mechanism for changing the pitch of the blades to not be subjected to the centrifugal forces induced by the blade 40.

In this example, the pivot 31P is connected to a radial rod 43 through a helical connection 44 of the screw type. This helical connection 44 makes it possible to transform a radial translation movement of the radial rod 43 into a rotation of the pivot 31P of the blade, and therefore of the blade 40.

In this example, the helical connection 44 is formed from a ball recirculating screw 45 which is housed in the pivot 31P. This recirculating screw 45 is arranged at the radially external end of the radial rod 43. In this way, the pivot 31P forms a nut for the screw 45. The latter 45 comprises a set of balls 46 and a ball recirculation groove 47 arranged inside the screw 45. This makes it possible for the balls to circulate in a closed circuit around and inside the screw 45. Such a ball recirculating screw makes it possible to reduce the friction induced by the rotation of the blade pivot, and increases in particular its effectiveness and its service life.

The pitch-changing mechanism also comprises a return spring 48 that has first and second opposite ends. The first end which here is upper is fixed to the radial rod 43, for example at the lower end of the screw 45. The second end which here is lower is fixed to a cover 49. This cover 49 is itself fixed to the inside of the rotating ring 41 via fastening elements 49a. The fastenings of the first and second ends of the spring 48 can be carried out by gluing or welding. The spring 48 is, in this example, arranged around the radial rod 43. In other words, the radial rod 43 is inserted into the spring 48. However, it can be considered using a spring arranged in a different way while still remaining in the spirit of this invention. It is of course possible to use a plurality of return springs, in series or in parallel.

The cover 49 can have the form of a plurality of covers present on each blade in order to decrease the overall mass of the mechanism. Alternatively, an annular cover can be provided over the entire circumference of the rotating ring 41, for easier mounting. The cover 49 is here pierced in such a way that the radial rod 43 passes through it.

In reference to FIG. 4A, the spring 48 is at rest. In this limit position, the screw 45 is pushed outwards by the spring 48 and the pivot 31P is oriented into a position corresponding to the feathered position of the blade 40. It is understood in this invention by the expression "feathered" that the blade is oriented in a position wherein the latter is in the direction of flow of the air in order to reduce its drag. In FIG. 4B, the spring 48 is compressed (or deformed) by the action of the means of translation (not shown here) which have radially moved the rod 43 inwards, in the direction of the arrow. The position shown corresponds to a so-called "reverse" limit position of the blade 40, wherein the latter forms an angle of about 120° with the direction of flow of the air. In this embodiment, the control shaft of the pitch-changing system works primarily in traction.

Figure 5A:
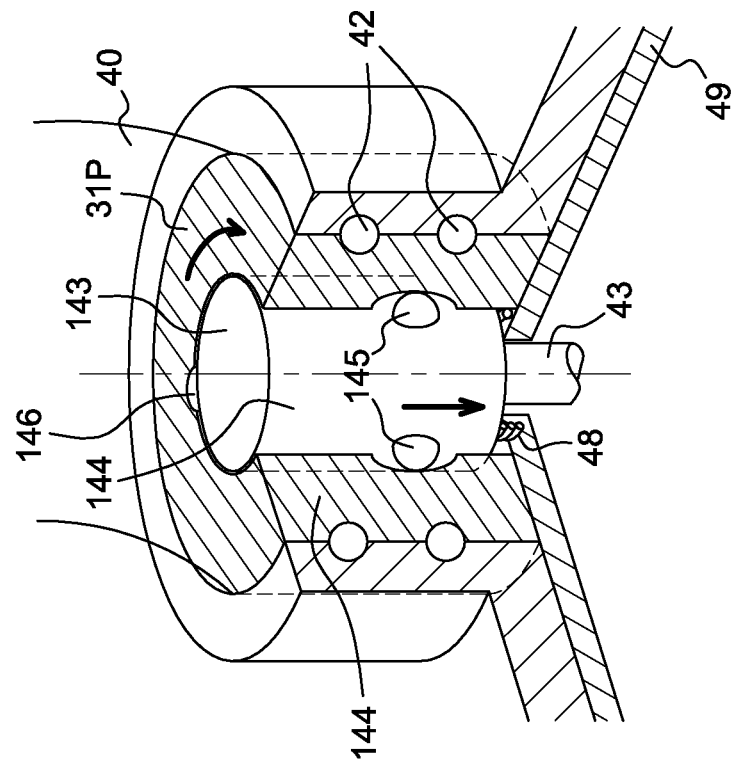
FIGS. 5A and 5B show another embodiment of a pitch-changing system according to the invention; and, FIGS. 6A and 6B show different means of translation that can be used in a module according to the invention.
Figure 5B:
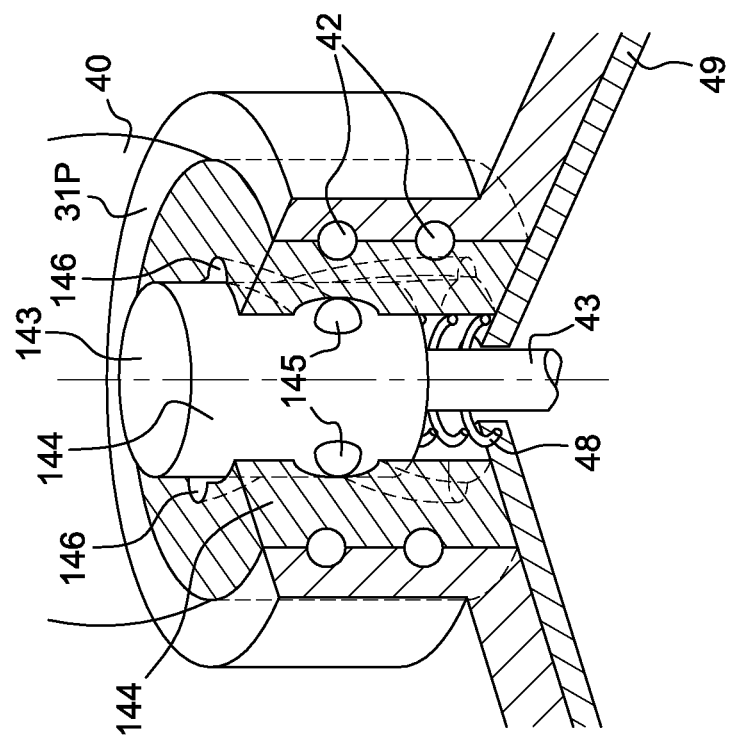

FIGS. 5A and 5B show another embodiment of the pitch-changing mechanism. This mechanism comprises in particular another type of helical connection 144 of the endless screw type also. The identical reference signs on the various figures designate, unless mentioned otherwise, identical elements or features. An end piece 143 with a generally cylindrical shape here is arranged at a radially outer end of the rod 43. The substantially cylindrical outer surface 144 of this end piece 143 is provided with balls 145 protruding from the latter. The blade pivot 31P comprises a cylindrical portion inside of which is mounted the end piece 143. This cylindrical portion comprises helical splines 146 with which the balls 145 cooperate.

In FIG. 5A, the helical connection 144 occupies a feathered position wherein the spring 48 is at rest while in FIG. 5B the helical connection 144 occupies another position wherein the spring 48 is compressed by a radial movement of the rod 43 inwards. The control shaft 25 also works substantially in traction.

Figure 6B:
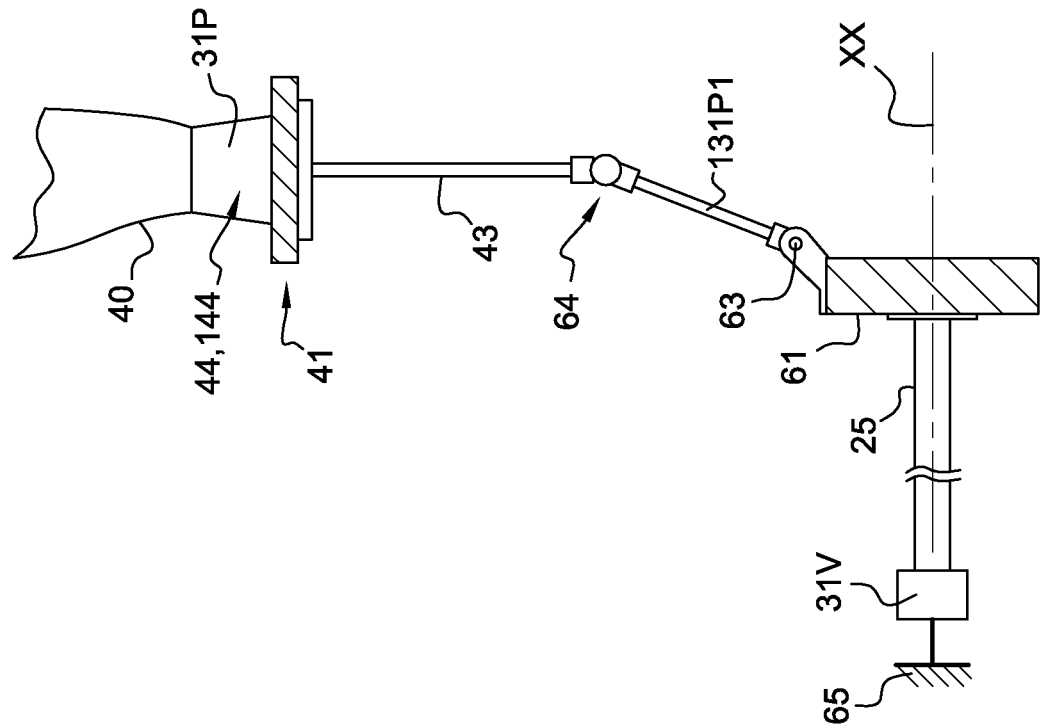
Figure 6A:
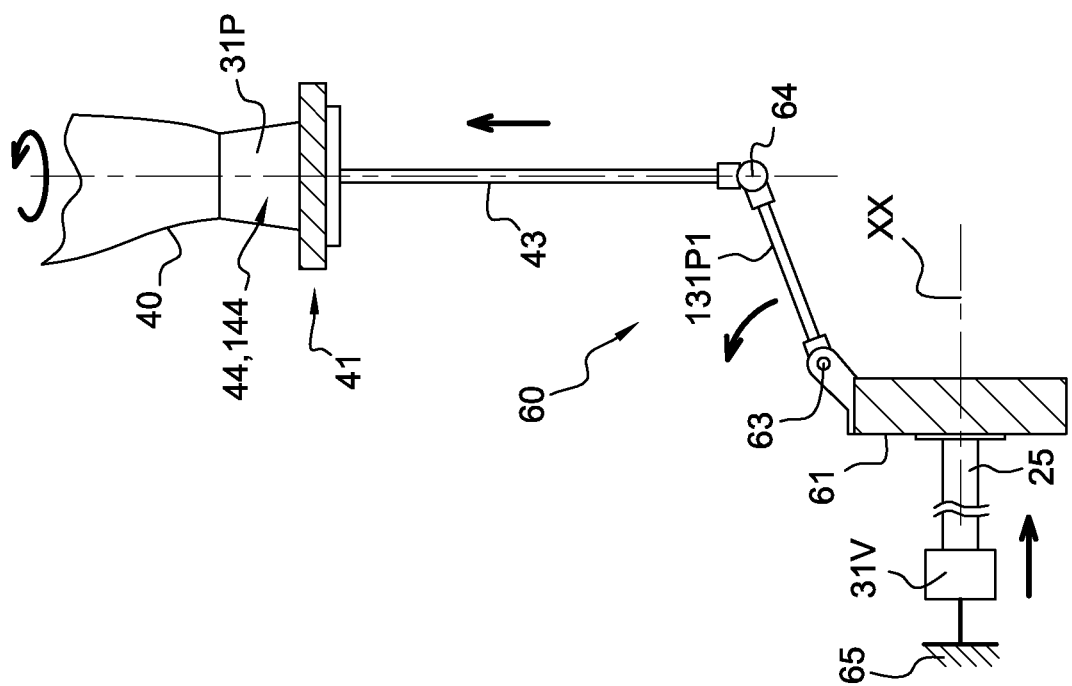

FIGS. 6A and 6B show cross-sections on the upstream propeller 31 of the turboprop showing an example of the means of translation 60 implementing the control shaft 25 and the cylinder 31V. In this example, the means of translation 60 comprise a plateau 61 of the ferrule 25V centred on the longitudinal axis and mounted on the control shaft 25. The plateau 61 is connected to each rod 43 by means of a lever 131P1. The latter has an end which is fixed on the plateau 61 via a pivot connection 63 according to a tangential axis. A tangential axis is an axis perpendicular to the longitudinal axis and to a radial axis. The other end opposite the lever 131P1 is fixed on the radial rod 43 by means of a pivot connection 64 around a tangential axis. In this way, when the cylinder 31V is actuated and moves the plateau 61 from upstream to downstream, the lever 131P1 moves the radial rod 43 outwards, which causes a simultaneous rotation of the blades 40. Of course, there are here as many levers 131P1 as rods 43, and therefore blades 40. The control shaft 25 also works primarily in traction.

It is understood that the embodiments described hereinabove can be combined together, in particular a helical connection 44 or 144 can be combined indifferently with means of translation 60.

Moreover, the sizing in traction is not as severe as the sizing in compression, in particular, because there is no risk of buckling of the control shaft 25 in traction.

The weight of the levers 31P1, 131P1 and of the rods 43 participates, thanks to the centrifugal force, in the returning of the blades 40 to a position that can correspond to their feathered position. The springs 48 also participate in the returning of the blades 40 into a position that can correspond to their feathered position. The returning of the blades to their feathered position then being automatic this makes it possible to avoid, advantageously, using a counterweight system. This configuration entails that the control shaft 25 work primarily in traction and is sized only to counter the aerodynamic forces that are applied to the blades during the adjustment to the large pitches.

The invention claimed is:

1. Turbine engine module comprising:
    an upstream propulsive unit comprising a propellers doublet respectively upstream and downstream, each of said upstream and downstream propellers comprising blades,
    a power turbine shaft intended for rotating the propellers doublet,
    a speed reducer connected to the propellers doublet and driven by the power turbine shaft, a pitch-changing system comprising a cylinder that controls the pitch of the blades of the upstream propeller, a rotational axis (XX) of the propellers doublet being shifted in relation to a rotational axis (YY) of the power turbine shaft, characterised by the fact that the cylinder is placed downstream of the speed reducer, and in that the pitch-changing system comprises a control shaft for controlling the pitch of the blades that connect the cylinder to the blades of the upstream propeller, the cylinder being arranged in such a way as to move the control shaft axially, the speed reducer of which comprising a differential gear train with a sun gear, a planetary carrier and a ring gear, with the control shaft for controlling the pitch of the blades passing through the sun gear.

2. The module according to claim 1, of which the control shaft is movable in translation along the rotational axis of the propellers doublet.

3. The module according to claim 1, the pitch-changing system of which comprises a pitch-changing mechanism which comprises pivots of the blades, with the control shaft being connected to the pivots of the blades in such a way that the axial movement of the control shaft causes the change in the pitch of the blades.

4. The module according to claim 3, wherein the kinematics between the pitch-changing mechanism, the control shaft and the cylinder is arranged in such a way that the control shaft works primarily in traction.

5. The module according to claim 4, the control shaft of which is rotatably mounted with respect to a movable member of the cylinder by a load transfer bearing.

6. The module according to claim 1, the control shaft of which is integral in rotation with the upstream propeller.

7. The module according to claim 6, the control shaft of which is guided by guideways, inside the rotor of the upstream propeller.

8. The module according to claim 7, wherein the control shaft is guided by the guideways with balls.

9. The module according to claim 1, an air intake of which of an engine comprises an air intake sleeve, with the air intake sleeve having the form of a lobe adjacent to the speed reducer.

10. The module according to claim 1, the speed reducer of which comprises a first stage in the form of a simple gear train between the power turbine shaft and the differential gear train.

11. The module according to claim 10, wherein the simple gear train of the first stage comprises a wheel connected to the sun gear of the speed reducer.

12. The module according to claim 1, the planetary carrier of which is connected to the upstream propeller and the ring gear to the downstream propeller of the propellers doublet, with the module further comprising a fixed structure with a sleeve, a first shaft element being supported by bearings inside the sleeve, said first shaft element connecting the ring gear to the upstream propeller, a second shaft element supported by bearings inside the first shaft element, with the second shaft element connecting the planetary carrier to the downstream propeller.

* * * * *